UNITED STATES PATENT OFFICE.

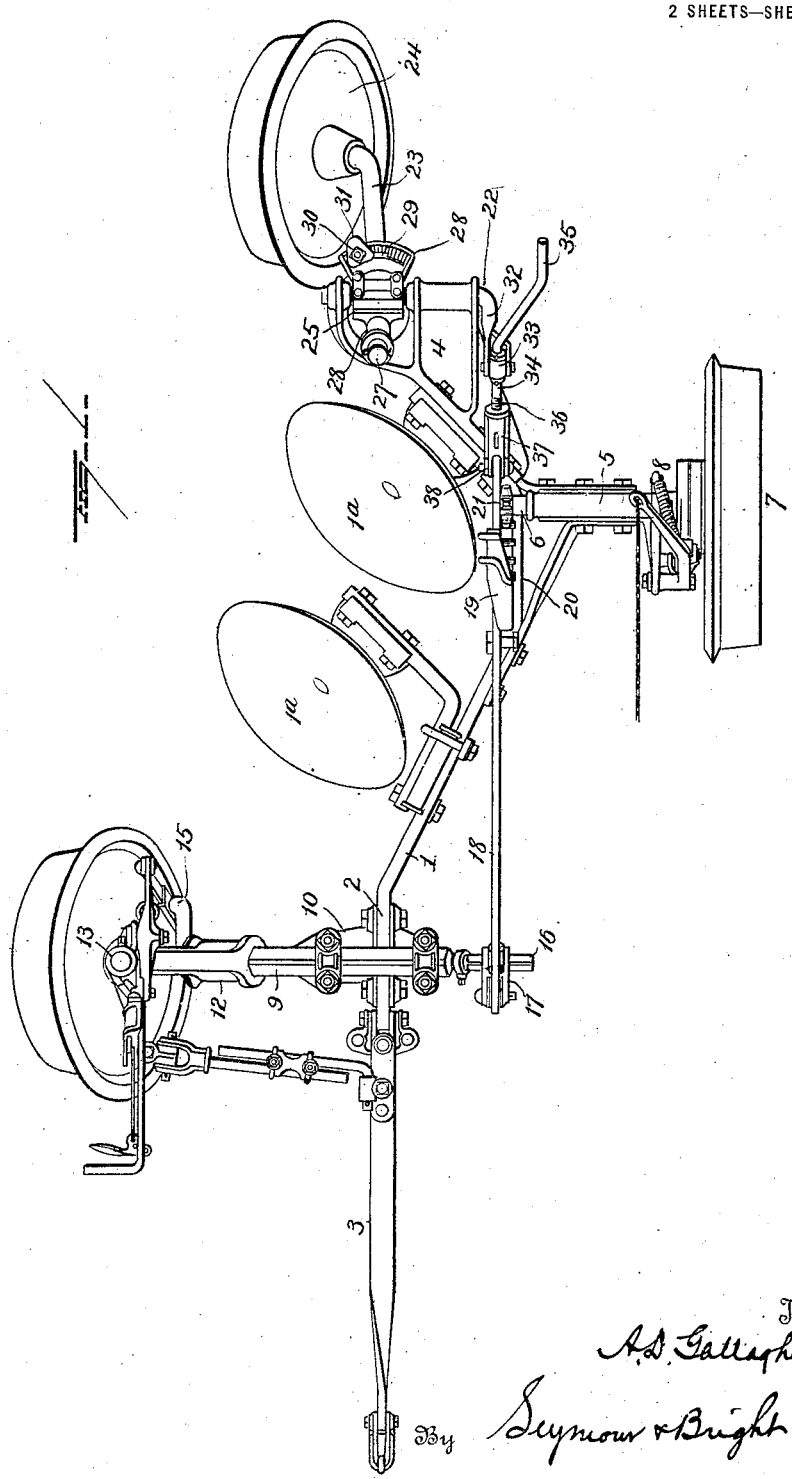

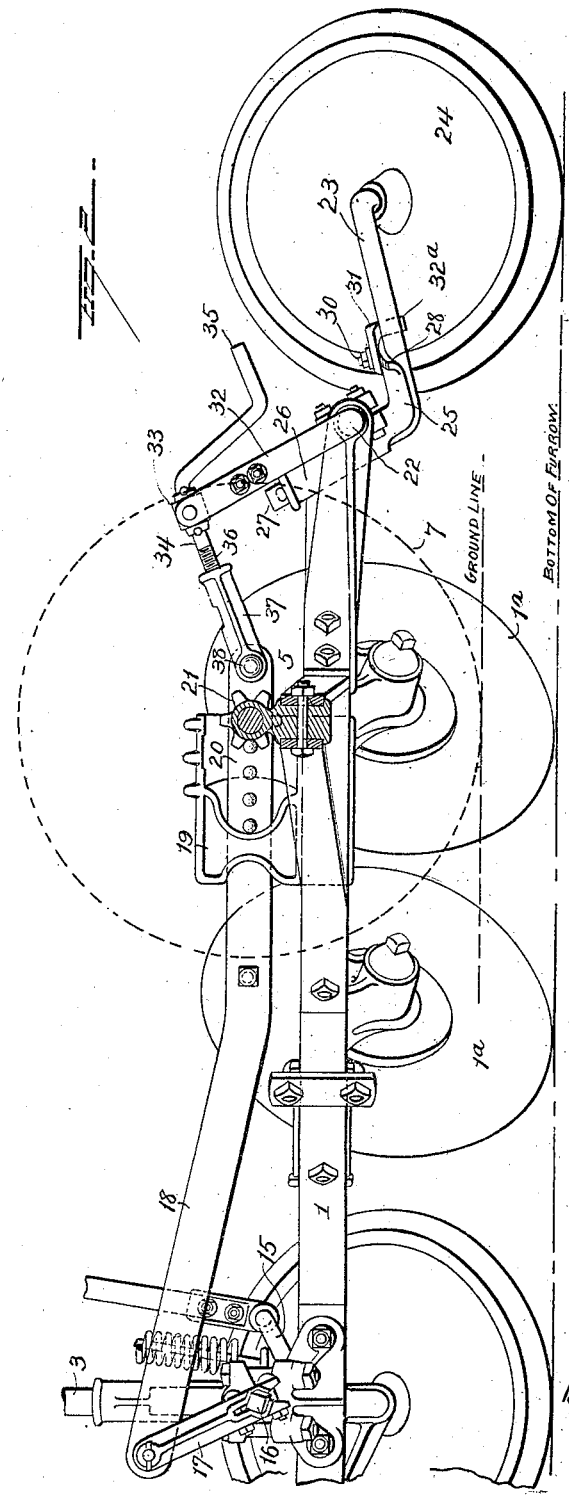

ARTHUR D. GALLAGHER, OF SOUTH BEND, INDIANA, ASSIGNOR TO OLIVER CHILLED PLOW WORKS, OF SOUTH BEND, INDIANA.

ADJUSTING MEANS FOR PLOWS.

1,377,064.   Specification of Letters Patent.   Patented May 3, 1921.

Application filed May 24, 1920. Serial No. 383,748.

*To all whom it may concern:*

Be it known that I, ARTHUR D. GALLAGHER, a citizen of the United States, and a resident of South Bend, in the county of Saint Joseph and State of Indiana, have invented certain new and useful Improvements in Adjusting Means for Plows; and I do hereby declare the following to be a full, clear, and exact description of the invention, such as will enable others skilled in the art to which it appertains to make and use the same.

This invention relates to improvements in wheeled plows, and more particularly to depth adjusting means for a plow provided with power lift mechanism,—such, for example, as that illustrated in application for patent filed by Rudolph J. Altgelt on the 3rd day of April, 1920, and designated by Serial No. 371,076.

One object of my present invention is to provide simple and efficient means coöperable with a rear or follower wheel and with a part of the power lift mechanism, whereby the depth to which the earth working members will enter the ground may be easily and accurately adjusted and regulated.

With this and other objects in view, the invention consists in certain novel features of construction and combinations of parts as hereinafter set forth and pointed out in the claims.

In the accompanying drawings; Figure 1 is a plan view of a plow showing an embodiment of my invention, and Fig. 2 is an enlarged view showing the rear wheel mounting and devices coöperating with the axle of the wheel to adjust the plow for depth of plowing.

1 represents an approximately U-shaped frame with which the earth-working members 1ª, are connected. The forward end portion 2 of the frame is disposed in a plane parallel with the longitudinal axis of the plow structure and substantially coincident with the line of draft of the same, and with this forward portion 2 of the frame, a drawbar 3 is connected for attachment to a tractor (not shown). At the rear end of the frame, a bracket 4 is provided for a purpose hereinafter explained and an intermediate portion of the frame carries a sleeve 5 which provides a mounting for the axle 6 of a land wheel 7,—the latter being adapted to be connected with said axle through the medium of manually controlled clutch devices indicated at 8.

A tubular bar 9, which is inclined somewhat when the plow is in working position, is rigidly secured to the forward portion of the frame through the medium of a bracket 10. At one end of the tubular frame bar 9, a bracket 11 is located and provided with a sleeve portion 12 rigidly secured to said tubular frame bar. The bracket 11 also provides a mounting for the standard axle 13 of a front furrow wheel 14, and said standard axle is connected through the medium of suitable rod and hand lever devices with a crank 15 on a shaft 16 passing through the tubular bar 9, all as specifically described and illustrated in the copending application hereinbefore designated, and these devices may be utilized for leveling the plow.

The shaft 16 is provided at or near its inner end with a crank arm 17, with which one end of an actuating bar 18 is connected. This bar is longitudinally movable through a bracket 19 secured to the frame 1 and carries a plurality of pins forming a rack 20 with which a pinion 21 carried by the land wheel axle 6, is adapted to mesh, so that when said shaft is clutched to the land wheel, motion will be imparted to the bar 18 and from the latter, through the shaft 16 and its connections with the standard axle and the frame and thus power will be applied to raise the forward portion of the frame, as fully explained in the copending application hereinbefore identified.

A horizontal shaft 22 is mounted in the bracket 4 at the rear end of the frame and may be considered to constitute, in effect, a portion of a crank axle 23, the latter having a spindle portion mounted in the hub of a rear furrow or follower wheel 24. A bracket 25 is securely clamped to the shaft 22 and is made with a tubular member 26 in which the standard portion 27 of the crank axle 23 is so mounted as to permit the wheel 24 to swivel. It is desirable to provide means whereby the lateral play of the rear furrow wheel, permitted by the swivel connection of the axle of this wheel with the shaft 22, may be limited to a greater or less degree, and for this purpose the bracket 25 is provided with a segmental, toothed or serrated member 28 having a slot 29 for the accommodation of a bolt 30 by means of which a toothed or serrated stop member 31 is secured to said segmental member,—said stop member having a part 32ª disposed in the path of movement of the crank axle 23.

The horizontal shaft 22 is provided at one end with a crank arm 32 and the latter supports, at or near its free end, a pivoted sleeve 33. A manually operable shaft 34 is mounted to turn in the pivoted sleeve 33 but is prevented from movement longitudinally through the same. One end of said shaft 34 is provided with a crank handle 35, while its other end portion is threaded as at 36 and enters one end of an internally threaded sleeve 37, the other end of the latter being pivotally attached as at 38 to the rear end of the actuating bar 18.

It is apparent that when the actuating bar is moved by power from the land wheel to effect the raising of the forward portion of the plow frame as previously explained, the movement of said bar will also operate to turn the shaft 22 and move the rear furrow wheel axle in a manner to effect the raising of the rear portion of the frame on the rear furrow wheel. By making the connections between the actuating bar and the rear axle members manually adjustable through the medium of the threaded coöperation of the shaft 34 with the sleeve 37, the frame may be readily adjusted vertically in a manner to control and regulate the depth which the earth working members 1ª will enter the ground. Thus simple and efficient depth-adjusting means are provided for the plow.

Various changes might be made in the details of construction of my invention without departing from the spirit thereof or limiting its scope and hence I do not wish to restrict myself to the precise details herein set forth.

Having fully described my invention what I claim as new and desire to secure by Letters-Patent, is:—

1. The combination with a wheeled plow including a rear furrow wheel and a pivotal crank axle structure therefor, and power lift mechanism including a longitudinally movable actuating bar, of an internally threaded sleeve connected with said actuating bar, a manually operable shaft having swivel connection with said crank axle structure and having a threaded portion entering said sleeve.

2. The combination with the frame of a wheeled plow, and power lift mechanism including an actuating bar, of a horizontal shaft mounted at the rear end of said frame and provided with a crank arm, a bracket secured to said shaft, a crank axle having a part mounted in said bracket, a rear furrow wheel on said axle, a manually operable shaft having swivel connection with the crank arm of said first mentioned shaft, and an adjustable connection between said manually operable shaft and a part of the power lift mechanism.

3. The combination with the frame of a wheeled plow, of a horizontal shaft mounted at the rear end portion of the frame and provided with a crank arm, a bracket secured to said shaft and having an axle mounting, a rear furrow wheel, a crank axle having a part mounted in the hub of said wheel and a part swiveled in said mounting, a sleeve pivoted to the crank arm of said shaft, a manually operable shaft having swivel connection with said sleeve and having a threaded portion and a member connected with a part on the frame and having threaded connection with the manually operable shaft.

4. The combination with a wheeled plow frame, of a horizontal shaft mounted at the rear portion of the frame, a bracket secured to said shaft, a rear furrow wheel, a crank axle having a part mounted in the hub of said wheel and having a part swiveled to said bracket, a toothed member rigid with said bracket and disposed over a portion of said axle, a toothed stop member adjustably secured to said first-mentioned toothed member and having a part disposed in the path of movement of the swiveled crank axle, and means for controlling the operation of said shaft.

In testimony whereof, I have signed this specification in the presence of two subscribing witnesses.

ARTHUR D. GALLAGHER.

Witnesses:
F. C. CLINTON,
GEO. G. JOHNSON.